(12) United States Patent
Dahlfort et al.

(10) Patent No.: US 9,209,901 B2
(45) Date of Patent: Dec. 8, 2015

(54) CONFIGURABLE SINGLE-FIBER OR DUAL-FIBER OPTICAL TRANSCEIVER

(71) Applicant: TELEFONAKTIEBOLAGET L M ERICSSON (PUBL), Stockholm (SE)

(72) Inventors: Stefan Dahlfort, Santa Clara, CA (US); Steven Alleston, Saratoga, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 431 days.

(21) Appl. No.: 13/682,329

(22) Filed: Nov. 20, 2012

(65) Prior Publication Data

US 2014/0140689 A1    May 22, 2014

(51) Int. Cl.
*H04B 10/00* (2013.01)
*H04B 10/40* (2013.01)
*H04B 10/03* (2013.01)

(52) U.S. Cl.
CPC ............. *H04B 10/40* (2013.01); *H04B 10/03* (2013.01)

(58) Field of Classification Search
CPC ........ H04B 10/40; H04B 10/43; H04B 10/25; H04B 10/2503; H04B 10/2581; H04B 10/03; H04J 14/0291; H04Q 11/0001; G02B 6/3562
USPC .............. 398/135, 138, 139, 144, 2, 48, 5, 19
See application file for complete search history.

(56) References Cited

U.S. PATENT DOCUMENTS

| | | | |
|---|---|---|---|
| 5,854,702 A * | 12/1998 | Ishikawa et al. ............... 398/137 |
| 6,377,373 B1 * | 4/2002 | Kawazawa et al. ............. 398/82 |
| 7,359,592 B2 * | 4/2008 | Truong ........................... 385/24 |
| 7,421,207 B2 * | 9/2008 | Eiselt et al. .................... 398/181 |
| 7,558,477 B2 * | 7/2009 | Chung et al. ...................... 398/5 |
| 7,613,391 B2 * | 11/2009 | Tajima .............................. 398/5 |
| 7,613,392 B2 * | 11/2009 | Gerstel ............................. 398/5 |
| 7,787,764 B2 * | 8/2010 | Hung et al. ....................... 398/5 |
| 7,787,794 B2 * | 8/2010 | Yamada et al. ................. 399/81 |
| 7,840,139 B2 * | 11/2010 | Eiselt et al. .................... 398/159 |
| 8,121,478 B2 * | 2/2012 | Kash et al. ...................... 398/50 |
| 8,135,278 B2 * | 3/2012 | Lee et al. ......................... 398/68 |
| 8,358,929 B2 * | 1/2013 | Lewis et al. ..................... 398/19 |
| 9,042,728 B2 * | 5/2015 | Grobe ............................. 398/71 |
| 2002/0118413 A1 * | 8/2002 | Yamada et al. ................ 359/118 |
| 2005/0180749 A1 * | 8/2005 | Koley et al. .................... 398/45 |

(Continued)

OTHER PUBLICATIONS

Cisco Transceiver Modules Data Sheet, "Cisco Small Form-Factor Pluggable Modules for Gigabit Ethernet Applications", 2012, the whole document.

*Primary Examiner* — Daniel Washburn
*Assistant Examiner* — Hibret Woldekidan

(57) ABSTRACT

An optical transceiver performs dual mode operations in an optical network. The dual mode operations include a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions. A switching module coupled to the optical transceiver is set in accordance with a control signal such that a transmitter module transmits and a receiver module receives via a first optical connector receptacle to enable the single-fiber mode, or such that the transmitter module transmits via the first optical connector receptacle and the receiver module receives via a second optical connector receptacle to enable the dual-fiber mode.

18 Claims, 5 Drawing Sheets

(56) References Cited

U.S. PATENT DOCUMENTS

| | | | |
|---|---|---|---|
| 2006/0165412 A1* | 7/2006 | Jung et al. | 398/71 |
| 2007/0264009 A1* | 11/2007 | Sabat et al. | 398/5 |
| 2009/0290866 A1* | 11/2009 | Chung et al. | 398/5 |
| 2010/0228238 A1* | 9/2010 | Brennan et al. | 606/13 |
| 2011/0116647 A1* | 5/2011 | Terlizzi et al. | 381/71.6 |
| 2013/0071127 A1* | 3/2013 | Ota et al. | 398/139 |
| 2013/0077916 A1* | 3/2013 | Mahlab | 385/20 |
| 2013/0236175 A1* | 9/2013 | Sethumadhavan et al. | 398/55 |
| 2014/0072305 A1* | 3/2014 | McEwan et al. | 398/72 |

\* cited by examiner

CONFIGURABLE SINGLE-FIBER OR DUAL-FIBER OPTICAL TRANSCEIVER

TECHNICAL FIELD

Embodiments of the invention relate to optical communications; and more specifically, to an optical transceiver operating in an optical network.

BACKGROUND

A transceiver is a device including both a transmitter and a receiver that are combined and share common circuitry within a single housing. Optical transceivers are used in a fiber optical transmission system on both transmit and receive sides of a fiber optical link. In systems designed for the access portion of a telecommunications network, optical transceivers typically use single-fiber interfaces (i.e., bi-directional transmission), while for metro and long-haul systems, the optical transceivers typically use dual-fiber interfaces (i.e., one fiber per transmission direction).

Optical transceivers may be fabricated as integrated devices with silicon photonics technologies. The use of silicon photonics can significantly reduce the cost of optics. The cost reduction potential is however strongly depending on the production volumes. Expanding the application range of integrated optical transceivers can increase their volumes of usage and production, and therefore reduce their cost. Current optical transceivers are manufactured for either single-fiber communication or dual-fiber communication, but not both. Therefore, the current optical transceivers have a limited application range and high production cost.

Wavelength-division multiplexing (WDM) is a technology that multiplexes multiple optical carrier signals of different wavelengths onto a single optical fiber to increase capacity. Dense wavelength division multiplexing (DWDM) is one type of WDM that multiplexes optical signals within the 1550 nm band. Today most optical transceivers are used in DWDM metro or long-haul network systems, where dual-fiber communication is performed to prevent transmission impairments. These optical transceivers generally need additional external components (e.g., coupler, filter/mux, circulator, etc.) to work over a bidirectional single fiber. In the near future, DWDM technology will likely migrate further into access networks, where single-fiber communication dominates. Currently, optical transceivers for single-fiber communication are not adapted to the DWDM technology.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

SUMMARY

Figure 1A:
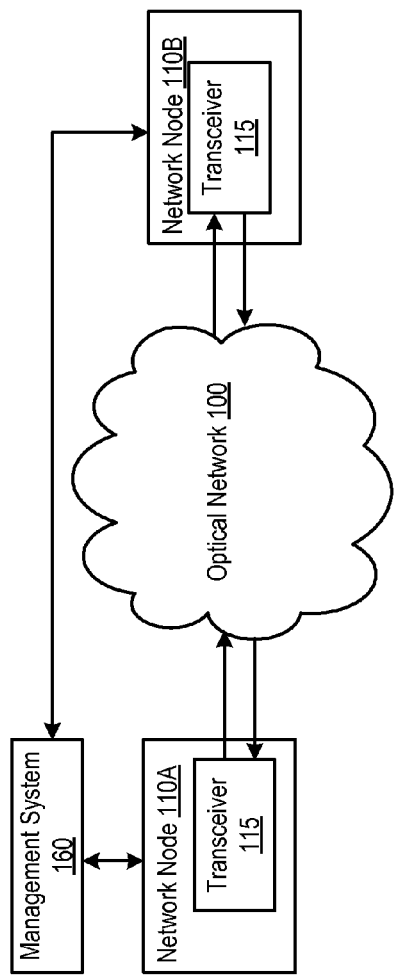
FIG. 1A illustrates an example of a dual-fiber optical network in which an embodiment of the invention may operate.

Embodiments of the invention provide a dual-mode optical transceiver. The optical transceiver including a transmitter module and a receiver module and performs dual mode operations in one or more wavelengths. The dual mode operations include a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions.

In one embodiment, a method of operating a dual-mode optical transceiver is described. A control signal is received by a switching module coupled to the optical transceiver. The switching module is adapted to enable the dual-mode operations. The switching module is set in accordance with the control signal such that the transmitter module transmits and the receiver module receives via a first optical connector receptacle of the optical transceiver to enable the single-fiber mode, or such that the transmitter module transmits via the first optical connector receptacle and the receiver module receives via a second optical connector receptacle of the optical transceiver to enable the dual-fiber mode. Optical signals are exchanged between the optical transceiver and one or more other network nodes using the single fiber when the single-fiber mode is enabled, or the two fibers when the dual-fiber mode is enabled.

In another embodiment, a dual-mode optical transceiver is described. The optical transceiver includes a transmitter module adapted to emit an outgoing optical signal, a receiver module adapted to detect an incoming optical signal, a first optical connector receptacle, a second optical connector receptacle, and a switching module including two switches adapted to enable the dual-mode operations. The switching module in accordance with a control signal sets the two switches such that the transmitter module transmits and the receiver module receives via the first optical connector receptacle to enable the single-fiber mode, or such that the transmitter module transmits via the first optical connector receptacle and the receiver module receives via the second optical connector receptacle to enable the dual-fiber mode. The optical transceiver is adapted to exchange optical signals with one or more other network nodes using the single fiber when the single-fiber mode is enabled, or the two fibers when the dual-fiber mode is enabled.

In yet another embodiment, a dual-mode optical transceiver is described. The optical transceiver includes a transmitter module includes a laser device adapted to emit an outgoing optical signal, a receiver module includes a photo detector adapted to detect an incoming optical signal, and a switching module including two optical switches adapted to enable the dual-mode operations. The optical transceiver further includes first and second coupling devices, both of which are coupled to the two optical switches in the switching module, a first optical connector receptacle coupled to the first coupling device, and a second optical connector receptacle coupled to the second coupling device. The switching module in accordance with a control signal sets the two optical switches such that the transmitter module transmits and the receiver module receives via the first optical connector receptacle to enable the single-fiber mode, or such that the transmitter module transmits via the first optical connector receptacle and the receiver module receives via the second optical connector receptacle to enable the dual-fiber mode. The optical transceiver is adapted to exchange optical signals with one or more other network nodes using the single fiber when the single-fiber mode is enabled, or the two fibers when the dual-fiber mode is enabled.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention provide a dual-purpose (also referred to as dual-mode) optical transceiver that can be configured to operate in a single-fiber mode or a dual-fiber mode. The configuration may be triggered by external control (e.g., a control plane element or a management system) or by internal control (e.g., software executed by a controller within the transceiver that performs self-adjusting or self-organizing functions). Both dual-fiber and single-fiber applications can be supported with the same transceiver. The dual-purpose transceivers have wide application space for current and future high volume markets, and, therefore, a high volume of usage and production at a low cost. The dual-purpose transceiver can also support protection switching when operating in single-fiber mode, i.e., switching over from bidirectional transmission over the currently used fiber to bidirectional transmission over the other fiber.

FIG. 1A illustrates an example of a dual-fiber optical network 100 in which an embodiment of the invention may operate. In this embodiment, a first network node 110A is coupled to a second network node 110B via the network 100. Each of the network nodes 110A and 110B includes an optical transceiver 115 operating in the dual-fiber mode. The optical transceivers 115 communicate with each other via two optical fibers, which carry uni-directional optical signals in opposite directions. The network 100 may be a DWDM optical network that multiplexes optical signals of different wavelengths onto the two fibers. The network 100 may be an access network; e.g., a passive optical network (PON) wherein the first network node 110A may be an optical line termination (OLT) in a central office and the second network node 110B may be an optical network unit (ONU) on or close to a customer's premise. Alternatively, the network 100 may be a metro network, a long-haul network or a regional network that is deployed in a wide area network system. In yet another embodiment, the network 100 may be a network within a data center (e.g., an intra-data-center network), or between data centers (e.g., an inter-data-center network).

Figure 1B:
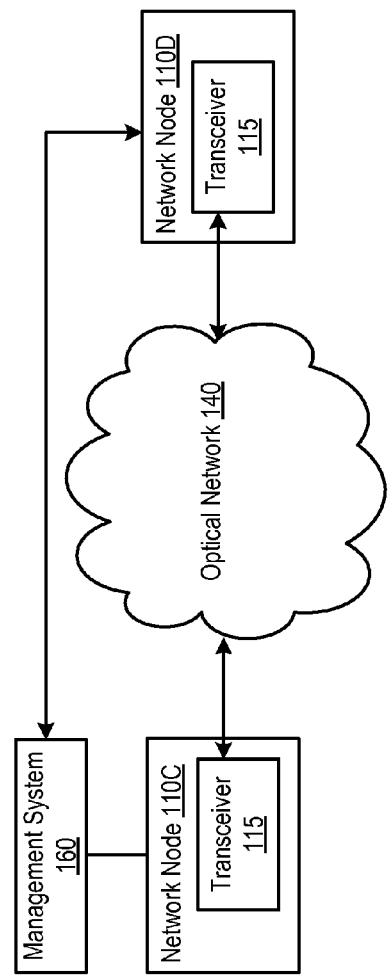
FIG. 1B illustrates an example of a single-fiber optical network in which an embodiment of the invention may operate.

FIG. 1B illustrates an example of a single-fiber optical network 140 in which an embodiment of the invention may operate. In this embodiment, a first network node 110C is coupled to a second network node 110D via the network 140. Each of the network nodes 110C and 110D includes the optical transceiver 115 operating in the single-fiber mode. The optical transceivers 115 communicate with each other via a single optical fiber, which carry bi-directional optical signals. The network 140 may be a DWDM optical network that multiplexes optical signals of different wavelengths onto the single fiber. The network 140 may be an access network; e.g., a PON wherein one network node (e.g., 110C) may be an OLT and the other network node (e.g., 110D) may be an ONU. Alternatively, the network 140 may be a metro network, a long-haul network or a regional network that is deployed in a wide area network system. In yet another embodiment, the network 100 may be a network within a data center (e.g., an intra-data-center network), or between data centers (e.g., an inter-data-center network).

Although only one optical transceiver 115 is shown in each of the network nodes 110A-D, in some embodiments each network node may include more than one optical transceiver 115. For example, a network node that is coupled to both an access network and a metro network may include a first optical transceiver on the side facing the access network and a second optical transceiver on the other side facing the metro network.

Further, in the examples of FIG. 1A and FIG. 1B, a management system 160 is coupled to each of the network nodes 110A-D. In one embodiment, the management system 160 may configure each optical transceiver 115 to operate in either the single-fiber mode or the dual-fiber mode.

Figure 2A:
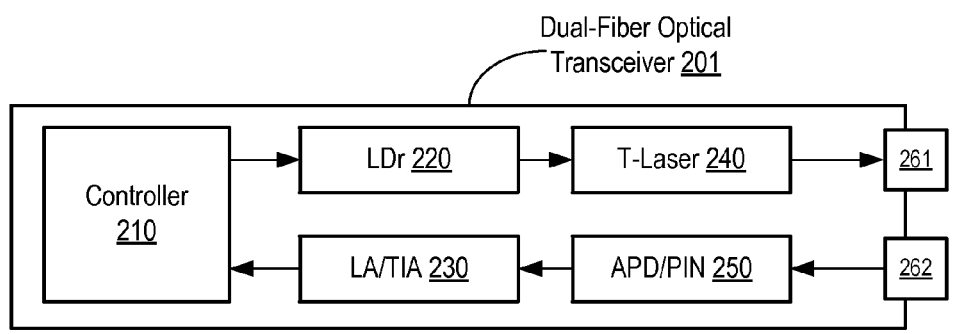
FIG. 2A illustrates an example of an optical transceiver for dual-fiber communication.

FIG. 2A illustrates an example of a dual-fiber optical transceiver 201, which includes a controller 210, a laser driver (LDr) 220, a linear amplifier and transimpedance amplifier (LA/TIA) 230, a tunable laser (T-laser) 240 for transmission, and a photo detector such as avalanche photodiode or Positive Intrinsic negative (APD/PIN) 250 for reception. The optical transceiver 201 has common pluggable form-factors, such as Small Form-Factor Pluggable (SFP), SFP+, 10 Gigabit Small Form-Factor Pluggable (XFP), etc. The optical transceiver 201 also includes two optical connector receptacles 261 and 262, one for transmission and the other one for reception. Each optical connector receptacles 261, 262 is adapted to receive a fiber connector, which is the part of the fiber that is connectorized to be plugged into the optical connector receptacle. The dual-fiber optical transceiver 201 operates in the dual-fiber mode only and cannot be configured to operate in the single-fiber mode.

Figure 2B:
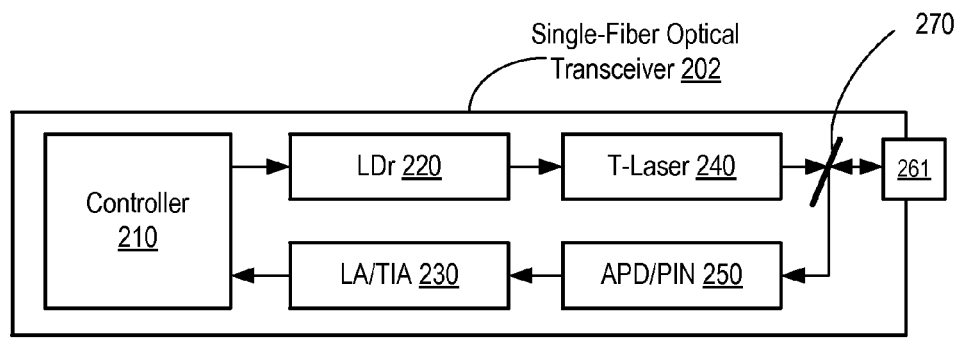
FIG. 2B illustrates an example of an optical transceiver for single-fiber communication.

FIG. 2B illustrates an example of a single-fiber bi-directional optical transceiver 202, which includes the controller 210, the LDr 220, the LA/TIA 230, the tunable laser 240 for transmission, and the photo detector such as APD/PIN 250 for reception. The optical transceiver 202 has common pluggable form-factors, such as SFP, SFP+, XFP, etc. The optical transceiver 202 includes only one optical connector receptacle 261 for both transmission and reception. The optical transceiver 202 uses a partly reflecting mirror 270 acting as a separator for outgoing (Tx) or incoming (Rx) light. The separating mirror can be wavelength selective or not. The single-fiber optical transceiver 201 operates in the single-fiber mode only and cannot be configured to operate in the dual-fiber mode.

Figure 3A:
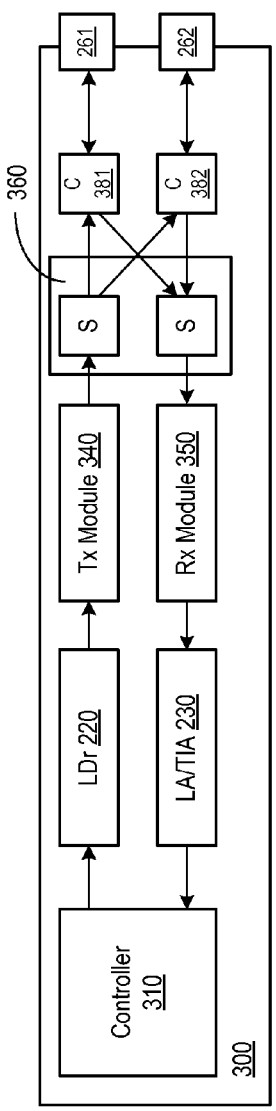
FIG. 3A illustrates an embodiment of a configurable dual-mode optical transceiver.

FIG. 3A illustrates an embodiment of a dual-mode optical transceiver 300, which may be an example of the optical transceiver 115 of FIG. 1A and FIG. 1B. The optical transceiver 300 includes a controller 310, the LDr 220, the LA/TIA 230, a transmitter module 340, a receiver module 350 and a switching module 360. The optical transceiver 300 also includes two optical connector receptacles 261 and 262. In one embodiment, the transmitter module 340 is a laser device, and the receiver module 350 is a photo detector (e.g., the APD/PIN 250 of FIGS. 2A and 2B). For DWDM communications, the laser device may be the tunable laser 240. The switching module 360 may include two optical switches ("S"), one connecting to the transmitter module 340 and other connecting to the receiver module 350. Each optical switch selects to which optical coupler ("C") 381, 382 to couple the incoming/outgoing light.

In the example FIG. 3A, the upper switch in the switching module 360 (as viewed) is coupled to the transmitter module 340 and the lower switch is coupled to the receiver module 350. In an alternative embodiment, the lower switch may be coupled to the transmitter module 340 and the upper switch may be coupled to the receiver module 350. Setting of the two switches changes the "polarity" of transmission and reception. The switch coupled to the transmitter module 340 can be set or configured to select one of the couplers 381, 382 to transmit outgoing light, and the switch coupled to the receiver module 350 can be set or configured to select the other one of the couplers 381, 382 to receive incoming light. When the two switches select the same coupler (381 or 382) for transmission and reception, the optical transceiver 300 is configured in the single-fiber mode for single-fiber usage. In the single-fiber mode, the incoming light and the outgoing light pass through the same optical connector receptacle (261 or 262) for transmission and reception. When the two switches select different couplers (381 and 382) for transmission and reception, the optical transceiver 300 is configured in the dual-fiber mode for dual-fiber usage.

For example, when the upper switch is coupled to the upper coupler 381 and the lower switch is coupled to the lower coupler 382, the optical transceiver 300 is configured for the dual-fiber mode. Alternatively, the upper switch may be coupled to the lower coupler 382 and the lower switch may be coupled to the upper coupler 381 for the dual-fiber mode. In the dual-fiber mode, the incoming light and the outgoing light pass through different optical connector receptacles (261 and 262) for transmission and reception.

The embodiment of FIG. 3A allows dual-mode operations with a single optical transceiver without duplicating the laser device or the photo detector. The tunable laser is an active optical component and is typically the most expensive and power-hungry. Typically, a tunable laser used in an optical transceiver is in part made of III-V material since silicon is difficult to be made to generate light. Therefore, having the same laser device switched between the two modes (i.e., two configurations) reduces cost of hardware parts and power consumption. Duplication of other components within the optical transceiver does not incur as much additional cost as duplicating the laser device.

Figure 3B:
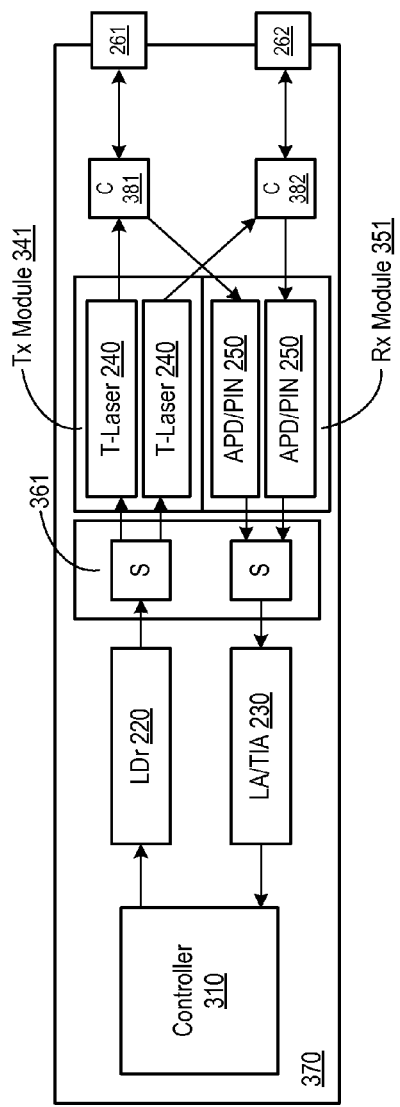
FIG. 3B illustrates another embodiment of a configurable dual-mode optical transceiver.

FIG. 3B illustrates another embodiment of a dual-mode optical transceiver 370, which may be another example of the optical transceiver 115 of FIGS. 1A and 1B. In this embodiment, the optical transceiver 370 includes a transmitter module 341, a receiver module 351, and a switching module 361 that includes two electrical switches, one being a 1:2 switch and the other being a 2:1 switch. In an alternative embodiment, these two switches can be replaced by a 3:3 switch. The optical transceiver 370 also includes the controller 310, the LDr 220 and the LA/TIA 230, which can be the same as the corresponding components in FIG. 3A. In one embodiment, the transmitter module 341 includes two laser devices (e.g., tunable lasers 240), and the receiver module 351 includes two photo detectors (e.g., the APD/PIN 250). One electrical switch selects one of the two tunable lasers 240 for emitting outgoing light, where it may be beneficial if the non-selected tunable laser does not emit any light, and the other electrical switch selects one of the two APD/PINs 250 for receiving incoming light. The first coupler 381 couples one of the tunable lasers 240 (e.g., the upper tunable laser in the example) and one of the APD/PINs 250 (e.g., the upper APD/PIN) to the first optical connector receptacle 261. The second coupler 382 couples the other tunable laser 240 (e.g., the lower tunable laser) and the other APD/PIN 250 (e.g., the lower APD/PIN) to the second optical connector receptacle 262. It is appreciated that each coupler 381, 382 may be coupled to either one of the tunable lasers 240 and either one of the APD/PINs 250, as long as the two couplers 381 and 382 are coupled to different tunable lasers 240 and different APD/PINs 250.

Figure 3C:
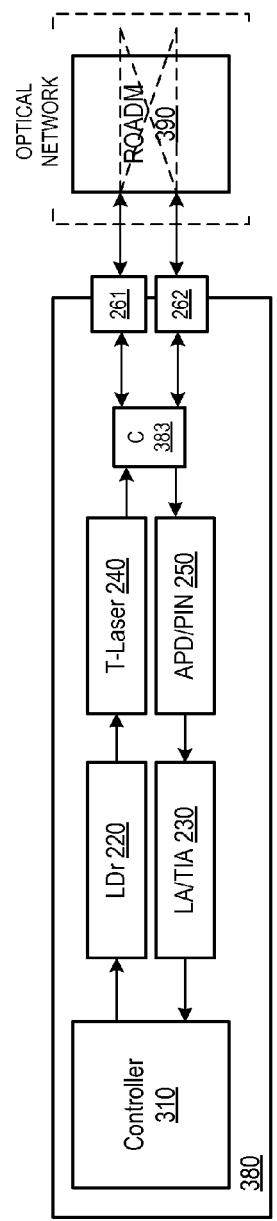
FIG. 3C illustrates yet another embodiment of an optical transceiver for dual-mode optical communication.

FIG. 3C illustrates yet another embodiment of a dual-mode optical transceiver 380. In this embodiment, the optical transceiver 380 does not include an internal switching module. Instead, the optical transceiver 380 is coupled to an external optical switching device, e.g., a reconfigurable optical add/drop multiplexer (ROADM) 390. The two connector receptacles 261, 262 are coupled to the tunable laser 240 and the APD/PIN 250 via a coupler 383.

In the example of FIGS. 3A-3C, an optical isolator (not shown) can be added in front of the laser device(s) to prevent the laser device(s) from receiving incoming light, which may either be the intended received light or reflections. Receiving incoming light by a laser device can severely impact or damage the laser device. In integrated photonics where isolators may be difficult to implement, narrow optical (tunable or fixed) filters may be used when there are sufficient wavelength differences between the two respective directions of transmission and reception. Further, in the example of FIGS. 3A-3C, as the couplers reduce the light passing through by at least 3 dB (e.g., for an even-ratio coupler), alternative embodiments may replace the couplers with tunable optical filters.

The optical transceiver described herein may be implemented by integrated photonics. Integrated photonics may have issues with polarization dependent loss. Polarization dependent loss especially impacts the received light, as the polarization state of the received light is typically unknown. Polarization dependent loss may be reduced if the receiver module 350 is physically close to the boundary of the integrated photonics chip facing the connectors (261 or 262) side. In some embodiments, polarization diversity may also be used to reduce the polarization dependent loss.

Figure 4:
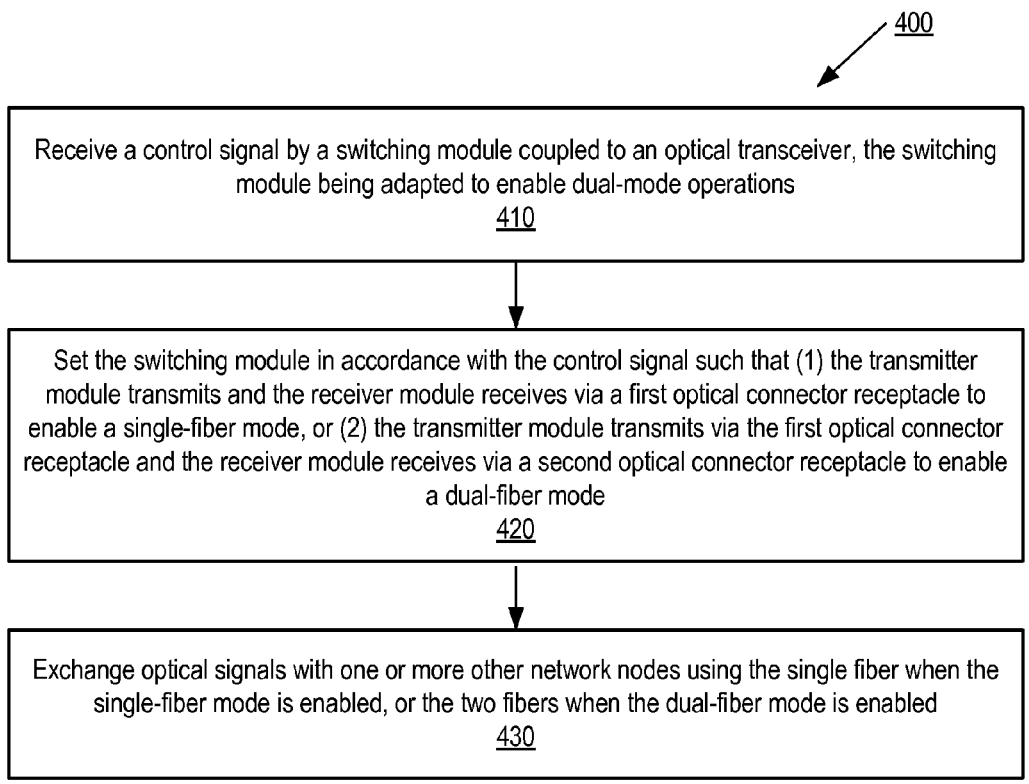
FIG. 4 is a flow diagram illustrating a method for operating a dual-mode optical transceiver according to one embodiment of the invention.

FIG. 4 illustrates a method 400 for operating a dual-mode optical transceiver according to one embodiment. The method 400 may be performed by the embodiments of the optical transceivers described above, such as optical transceivers of FIGS. 3A-3C. In one embodiment, a control signal is received by a switching module coupled to the optical transceiver, where the switching module is adapted to enable the dual-mode operations (block 410). In accordance with the control signal, the switching module may set its switching module such that the transmitter module transmits and the receiver module receives via a first optical connector receptacle of the optical transceiver to enable the single-fiber mode, or such that the transmitter module transmits via the first optical connector receptacle and the receiver module receives via a second optical connector receptacle of the optical transceiver to enable the dual-fiber mode (block 420). Optical signals, i.e., data traffic, are then exchanged between the optical transceiver and one or more other network nodes using the single fiber when the single-fiber mode is enabled, or using the two fibers when the dual-fiber mode is enabled (block 430).

In one embodiment, the optical transceiver may perform protection switching when operating in the single-fiber mode. For example, if the optical transceiver detects a failure in one of the dual-fiber links to which it is connected, the optical transceiver can switch to the other dual-fiber link for transmission and reception. That is, the optical transceiver can switch over from bidirectional transmission over the currently used fiber to bidirectional transmission over the other fiber.

Figure 5:
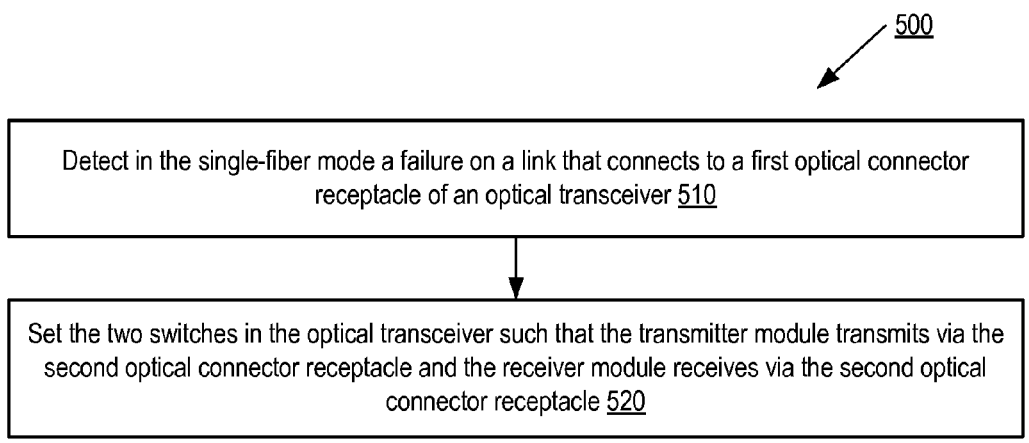
FIG. 5 is a flow diagram illustrating a method for protecting an optical transceiver in the single-fiber mode according to one embodiment of the invention.

FIG. 5 illustrates one embodiment of a method 500 for a dual-mode optical transceiver to perform failover protection when operating in the single-fiber mode. The method 500 may be performed by the embodiments of the optical transceivers described above, such as optical transceivers of FIGS. 3A-3C. In one embodiment, a failure is detected in the single-fiber mode on a link that connects to a first optical connector receptacle of an optical transceiver (block 510). Upon detection of the failure, the switching module of the optical transceiver may set its two switches such that the transmitter module transmits and the receiver module receives via the second optical connector receptacle instead of the first optical connector receptacle (block 520). Therefore, the faulty path through the first optical connector receptacle and the corresponding fiber may be avoided.

In one embodiment, the dual-mode optical transceiver may be self-sensing (also referred to as self-organizing), which means it can select the appropriate operation mode (i.e., single-fiber or dual-fiber mode, and in the single-fiber mode, which optical connector receptacle and the corresponding fiber connector to use) on its own without an instruction or command from an external system. To detect the appropriate operation mode, the optical transceiver may execute self-sensing operations to perform a trial-and-error process, e.g. with the switches ("S") are used to connect the transmitted and received lights first to one of the fiber connectors (corresponding to the connector receptacle 261 or 262) and then to the other (262 or 261), to determine whether light is present on either one of the fiber connectors. The optical transceiver can try to send light on the fiber connector where no light is detected, wait for the link to be established, and start transmission. This self-sensing function can be performed to avoid miss-match between the two sides of an optical link.

Figure 6:
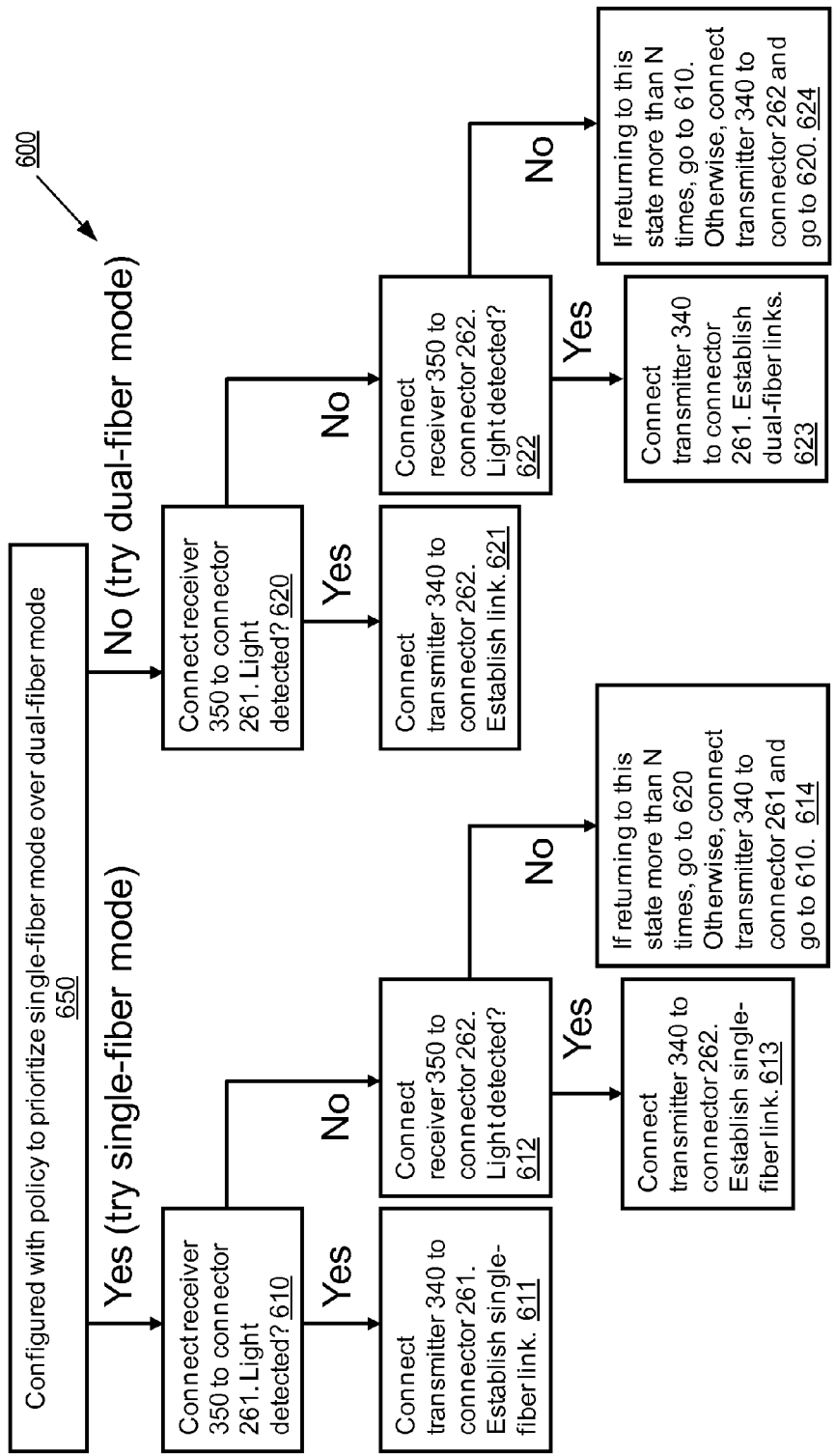
FIG. 6 is a diagram illustrating a self-sensing method according to one embodiment of the invention.

FIG. 6 illustrates one embodiment of a method 600 for a dual-mode optical transceiver to perform a self-sensing process. The method 600 may be performed by the embodiments of the optical transceivers described above, such as optical transceivers of FIGS. 3A-3C. For simplicity of the description, the connector receptacles 261 and 262 and the respective fiber connectors that are plugged therein are referred to as connectors 261 and 262, respectively. In one embodiment, the optical transceiver detects whether it is configured with a policy that prioritizes single-fiber mode over dual-fiber mode (650). If it is, the optical transceiver connects its receiver module 350 to the connector 261, and detects whether receiver module 350 receives light (610). If the receiver module 350 receives light at 610, the optical transceiver connects its transmitter module 340 to the connector 261 to establish a single-fiber link (611). If the receiver module 350 does not receive light at 610, the optical transceiver connects its receiver module 350 to the connector 262, and detects whether receiver module 350 receives light (612). If the receiver module 350 receives light at 612, the optical transceiver connects its transmitter module 340 to the connector 262 to establish a single-fiber link (613). If the receiver module 350 does not receive light at 612, the process proceeds to 614 (614). At 614, it is determined whether the process has returned to this state (614) more N times (N is a predetermined positive integer number). If the process has not returned to this state more N times, the optical transceiver connects its transmitter module 340 to the connector 261 and the process goes back to 610. Otherwise, the process goes from 614 to 620, where the optical transceiver attempts to establish the dual-fiber mode.

If at 650 the optical transceiver detects it is not configured with a policy that prioritizes single-fiber mode over dual-fiber mode, the optical transceiver connects its receiver module 350 to the connector 261, and detects whether receiver module 350 receives light (620). If the receiver module 350 receives light at 620, the optical transceiver connects its transmitter module 340 to the connector 262 to establish a single-fiber link (621). If the receiver module 350 does not receive light at 620, the optical transceiver connects its receiver module 350 to the connector 262, and detects whether receiver module 350 receives light (622). If the receiver module 350 receives light at 622, the optical transceiver connects its transmitter module 340 to the connector 261 to establish dual-fiber links (623). If the receiver module 350 does not receive light at 622, the process proceeds to 624 (624). At 624, it is determined whether the process has returned to this state (624) more N times (N is a predetermined positive integer number). If the process has not returned to this state more N times, the optical transceiver connects its transmitter module 340 to the connector 262 and the process goes back to 620. Otherwise, the process goes from 624 to 610, where the optical transceiver attempts to establish the single-fiber mode.

The operations of the diagrams of FIGS. 4-6 have been described with reference to the exemplary embodiment of FIGS. 3A-3C. However, it should be understood that the operations of the diagrams of FIGS. 4-6 can be performed by embodiments of the invention other than those discussed with reference to FIGS. 3A-3C, and the embodiment discussed with reference to FIGS. 3A-3C can perform operations different from those discussed with reference to the diagrams of FIGS. 4-6. While the diagrams of FIGS. 4-6 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touch-screen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of operating an optical transceiver that includes a transmitter module and a receiver module and performs dual mode operations in one or more wavelengths, the dual mode operations including a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions, the method comprising the steps of:
   receiving a control signal by a switching module coupled to the optical transceiver, the switching module being adapted to enable the dual-mode operations;
   setting the switching module in accordance with the control signal such that the transmitter module transmits and the receiver module receives via a first optical connector receptacle of the optical transceiver to enable the single-fiber mode, or such that the transmitter module transmits via the first optical connector receptacle and the receiver module receives via a second optical connector receptacle of the optical transceiver to enable the dual-fiber mode;
   exchanging optical signals with one or more other network nodes using the single fiber when the single-fiber mode is enabled, or the two fibers when the dual-fiber mode is enabled;
   detecting, in the single-fiber mode, a failure on a link that connects to the first optical connector receptacle; and
   setting switches within the switching module such that the transmitter module transmits via the second optical connector receptacle and the receiver module receives via the second optical connector receptacle.

2. A method of operating an optical transceiver that includes a transmitter module and a receiver module and performs dual mode operations in one or more wavelengths, the dual mode operations including a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions, the method comprising the steps of:
   receiving a control signal by a switching module coupled to the optical transceiver, the switching module being adapted to enable the dual-mode operations, wherein the switching module includes a first optical switch coupled to a laser device in the transmitter module and a second optical switch coupled to a photo detector in the receiver module, and both the first optical switch and the second optical switch are coupled to two optical couplers, which are further coupled to the first optical connector receptacle and the second optical connector receptacle, respectively; and
   setting the switching module in accordance with the control signal such that the transmitter module transmits and the receiver module receives via a first optical connector receptacle of the optical transceiver to enable the single-fiber mode, or such that the transmitter module transmits via the first optical connector receptacle and the receiver module receives via a second optical connector receptacle of the optical transceiver to enable the dual-fiber mode; and
   exchanging optical signals with one or more other network nodes using the single fiber when the single-fiber mode is enabled, or the two fibers when the dual-fiber mode is enabled.

3. A method of operating an optical transceiver that includes a transmitter module and a receiver module and performs dual mode operations in one or more wavelengths, the dual mode operations including a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions, the method comprising the steps of:

receiving a control signal by a switching module coupled to the optical transceiver, the switching module being adapted to enable the dual-mode operations, wherein the switching module includes a first electrical switch coupled to two laser devices in the transmitter module, and a second electrical switch coupled to two photo detectors in the receiver module, and both the transmitter module and the receiver module are coupled to two optical couplers, which are further coupled to the first optical connector receptacle and the second optical connector receptacle, respectively;

setting the switching module in accordance with the control signal such that the transmitter module transmits and the receiver module receives via a first optical connector receptacle of the optical transceiver to enable the single-fiber mode, or such that the transmitter module transmits via the first optical connector receptacle and the receiver module receives via a second optical connector receptacle of the optical transceiver to enable the dual-fiber mode; and exchanging optical signals with one or more other network nodes using the single fiber when the single-fiber mode is enabled, or the two fibers when the dual-fiber mode is enabled.

4. A method of operating an optical transceiver that includes a transmitter module and a receiver module and performs dual mode operations in one or more wavelengths, the dual mode operations including a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions, the method comprising the steps of:

receiving a control signal by a switching module coupled to the optical transceiver, the switching module being adapted to enable the dual-mode operations;

setting the switching module in accordance with the control signal such that the transmitter module transmits and the receiver module receives via a first optical connector receptacle of the optical transceiver to enable the single-fiber mode, or such that the transmitter module transmits via the first optical connector receptacle and the receiver module receives via a second optical connector receptacle of the optical transceiver to enable the dual-fiber mode;

exchanging optical signals with one or more other network nodes using the single fiber when the single-fiber mode is enabled, or the two fibers when the dual-fiber mode is enabled; and executing self-sensing software to determine whether the optical transceiver is to operate in the single-fiber mode or the dual-fiber mode, and which fiber connector to use for transmission and reception.

5. An optical transceiver that performs dual mode operations in one or more wavelengths, the dual mode operations including a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions, the optical transceiver comprising:

a transmitter module adapted to emit an outgoing optical signal;

a receiver module adapted to detect an incoming optical signal;

a first optical connector receptacle coupled to the transmitter module and the receiver module;

a second optical connector receptacle coupled to the transmitter module and the receiver module; and a switching module including two switches and coupled to the transmitter module and the receiver module, the switching module is adapted to enable the dual-mode operations, wherein the switching module in accordance with a control signal sets the two switches such that the transmitter module transmits and the receiver module receives via the first optical connector receptacle to enable the single-fiber mode, or such that the transmitter module transmits via the first optical connector receptacle and the receiver module receives via the second optical connector receptacle to enable the dual-fiber mode, wherein the optical transceiver is adapted to exchange optical signals with one or more other network nodes using the single fiber when the single-fiber mode is enabled, or the two fibers when the dual-fiber mode is enabled.

6. The optical transceiver of claim 5, wherein the switching module in the single-fiber mode is adapted to set the two switches such that the transmitter module transmits and the receiver module receives via the second optical connector receptacle when a failure occurs on a link that connects to the first optical connector receptacle.

7. The optical transceiver of claim 5, wherein the two switches include a first optical switch coupled to a laser device in the transmitter module and a second optical switch coupled to a photo detector in the receiver module, and both the first optical switch and the second optical switch are coupled to two optical couplers, which are further coupled to the first optical connector receptacle and the second optical connector receptacle, respectively.

8. The optical transceiver of claim 5, wherein the two switches include a first electrical switch coupled to two laser devices in the transmitter module, and a second electrical switch coupled to two photo detectors in the receiver module, and both the transmitter module and the receiver module are coupled to two optical couplers, which are further coupled to the first optical connector receptacle and the second optical connector receptacle, respectively.

9. The optical transceiver of claim 5, further comprising:

a controller adapted to execute self-sensing software to determine whether the optical transceiver is to operate in the single-fiber mode or the dual-fiber mode, and which fiber connector to use for transmission and reception.

10. The optical transceiver of claim 5, wherein the switching module is adapted to receive the control signal from a management system outside of and coupled to the optical transceiver.

11. The optical transceiver of claim 5, wherein the optical transceiver is located in an intra-data-center network, an inter-data-center network, an access network, a metro network, a regional network, or a long-haul network.

12. The optical transceiver of claim 5, wherein the optical transceiver is adapted to perform the dual mode operations in a Dense Wavelength Division Multiplexing (DWDM) optical network.

13. An optical transceiver that performs dual mode operations in one or more wavelengths, the dual mode operations including a single-fiber mode, in which a single fiber connecting the optical transceiver and another network node carries bi-directional optical signals, and a dual-fiber mode, in which two fibers connecting the optical transceiver and another network node carry respective uni-directional optical signals in opposite directions, the optical transceiver comprising:

a transmitter module comprising a laser device adapted to emit an outgoing optical signal;

a receiver module comprising a photo detector adapted to detect an incoming optical signal;

a switching module coupled to the transmitter module and the receiver module and includes two optical switches, the switching module adapted to enable the dual-mode operations;

a first coupling device and a second coupling device, both of which are coupled to the two optical switches in the switching module;

a first optical connector receptacle coupled to the first coupling device; and a second optical connector receptacle coupled to the second coupling device, wherein the switching module in accordance with a control signal sets the two optical switches such that the transmitter module transmits and the receiver module receives via the first optical connector receptacle to enable the single-fiber mode, or such that the transmitter module transmits via the first optical connector receptacle and the receiver module receives via the second optical connector receptacle to enable the dual-fiber mode, wherein the optical transceiver is adapted to exchange optical signals with one or more other network nodes using the single fiber when the single-fiber mode is enabled, or the two fibers when the dual-fiber mode is enabled.

14. The optical transceiver of claim 13, wherein the switching module in the single-fiber mode is adapted to set the two optical switches such that the transmitter module transmits and the receiver module receives via the second optical connector receptacle when a failure occurs on a link that connects to the first optical connector receptacle.

15. The optical transceiver of claim 13, further comprising a controller adapted to execute self-sensing software to determine whether the optical transceiver is to operate in the single-fiber mode or the dual-fiber mode, and which fiber connector to use for transmission and reception.

16. The optical transceiver of claim 13, wherein the switching module is adapted to receive the control signal from a management system outside of and coupled to the optical transceiver.

17. The optical transceiver of claim 13, wherein the optical transceiver is located in an intra-data-center network, an inter-data-center network, an access network, a metro network, a regional network, or a long-haul network.

18. The optical transceiver of claim 13, wherein the optical transceiver is adapted to perform the dual mode operations in a Dense Wavelength Division Multiplexing (DWDM) optical network.

* * * * *